United States Patent
Daly

(10) Patent No.: US 10,464,823 B2
(45) Date of Patent: Nov. 5, 2019

(54) SYSTEM AND METHOD FOR TREATING CONTAMINATED WASTEWATER

(71) Applicant: Daniel Daly, Tuscaloosa, AL (US)

(72) Inventor: Daniel Daly, Tuscaloosa, AL (US)

(*) Notice: Subject to any disclaimer, the term of this patent is extended or adjusted under 35 U.S.C. 154(b) by 536 days.

(21) Appl. No.: 14/958,593

(22) Filed: Dec. 3, 2015

(65) Prior Publication Data

US 2016/0159664 A1 Jun. 9, 2016

Related U.S. Application Data

(60) Provisional application No. 62/087,125, filed on Dec. 3, 2014.

(51) Int. Cl.
*C02F 1/02* (2006.01)
*C02F 101/30* (2006.01)
*C02F 103/10* (2006.01)
*C02F 103/32* (2006.01)
*C02F 103/36* (2006.01)

(52) U.S. Cl.
CPC .......... *C02F 1/025* (2013.01); *C02F 2101/30* (2013.01); *C02F 2103/10* (2013.01); *C02F 2103/327* (2013.01); *C02F 2103/365* (2013.01); *C02F 2209/09* (2013.01)

(58) Field of Classification Search
CPC .. C02F 1/025; C02F 2101/30; C02F 2103/10; C02F 2103/327; C02F 2103/365; C02F 2209/09
See application file for complete search history.

(56) References Cited

U.S. PATENT DOCUMENTS

| | | | | |
|---|---|---|---|---|
| 4,824,561 A | * | 4/1989 | Huang | C02F 1/025 210/178 |
| 2013/0062189 A1 | * | 3/2013 | Dighe | C02F 1/06 203/11 |
| 2013/0118994 A1 | * | 5/2013 | Altman | C02F 1/463 210/748.12 |
| 2013/0134106 A1 | * | 5/2013 | Suzuki | C02F 1/025 210/763 |

\* cited by examiner

*Primary Examiner* — James C Goloboy
(74) *Attorney, Agent, or Firm* — Adamsip, LLC; Stephen Thompson; J. Hunter Adams

(57) ABSTRACT

A system and method for treating contaminated wastewater is provided. The system and method may be used to treat wastewater such as hydraulic fracturing flowback water, which is contaminated with guar gum, similar gelling agents, or other biological polymers. The contaminated wastewater is pressurized and heated and then allowed to spend a residence time in a vessel. The process may be a continuous or a batch process. The exposure to a combination of heat and pressure causes the high molecular weight guar molecules to break down into simple sugars and other smaller, relatively low molecular weight compounds, thereby decreasing the viscosity of the fluid. Once the viscosity is reduced, the flowback water can then be treated for other contaminants using conventional treatment technologies and reused in fracking operations.

12 Claims, 2 Drawing Sheets

SYSTEM AND METHOD FOR TREATING CONTAMINATED WASTEWATER

CROSS REFERENCES

This application claims the benefit of U.S. Provisional Application No. 62/087,125, filed on Dec. 3, 2014, which application is incorporated herein by reference.

FIELD OF THE INVENTION

A preferred embodiment of the invention refers to a system and method for treating contaminated wastewater.

BACKGROUND

In recent years hydraulic fracturing (commonly referred to as "fracking" or "hydrofracking") has become a common method for extracting natural gas and other hydrocarbons from compact rock formations that were previously difficult to exploit. The hydraulic fracturing technique requires the injection of a typically water-based fluid (commonly referred to as "fracturing fluid" or "fracking fluid") into a well that has already been drilled. The fracking fluid initiates fractures in the rock formation and transports proppants, such as sand or ceramic balls, into the formation in order to support the opened fractures to maintain the permeability of the formation.

Gelling agents, such as guar gum, are typically added to the fracking fluid in order to increase the viscosity of the fluid. Guar gum is a high molecular weight polysaccharide produced from guar beans. Guar gum is known to be an effective thickening agent, and a relatively small amount can substantially increase the viscosity of a water-based fracking fluid. The increased viscosity is desirable because it allows the fluid to effectively and efficiently transport the proppant into the fractures in the formation. Once the fracturing operation has been completed, chemical agents commonly referred to as "gel breakers" are injected into the fractures in order to degrade the high molecular weight guar, thereby facilitating recovery of the fracking fluid. The fluid flows back to the surface (consequently, it is commonly referred to as "flowback water" or "flowback fluid") and is recovered. Flowback water comprises fracking fluid as well as formation water present in the pores of the rock formation.

Although some guar is degraded by the use of gel breakers, the recovered flowback water typically remains contaminated with significant quantities of guar, along with other contaminants. Because guar is a gel-like substance, it can cause significant performance problems with conventional treatment technologies such as membrane separation, coagulation, or flocculation. Synthetic polysaccharides that can be used to replace guar are available, but are also difficult to remove from flowback water. In addition, guar is often crosslinked using borate salts during the fracking process, thereby increasing the difficulty of removing the guar from the flowback water.

The fracking process requires substantial quantities of fracking fluid in order to effectively fracture a rock formation. Thus, fracking operations produce significant quantities of flowback water. Typically, over one million gallons of flowback water are recovered at a drilling site in the first 2 to 3 weeks alone. This flowback water must be recycled, disposed of, or treated and discharged to the environment. Because such large quantities are produced, flowback water would ideally be recycled for use in future fracking operations. However, the used gel present in flowback water can adversely affect the functioning of new gel, thereby necessitating the treatment of flowback water containing used gel before the water can be recycled. Preferably, this treatment would take place in the field near other fracking sites where the treated water could be reused.

Therefore, a need exists in the art for an effective and economical method for treating flowback water contaminated with guar or similar gelling agents. Furthermore, a need exists in the art for a system for treating flowback water that has the capability of treating substantial quantities of flowback water and that can be economically constructed in the field near fracking sites so that the treated water can be recycled for use in fracking operations.

SUMMARY

A preferred embodiment of the invention is directed to a system and method for treating contaminated wastewater. The method is particularly advantageous for treating hydraulic fracturing flowback water contaminated with a gelling agent, such as guar gum. Guar gum is a high molecular weight polysaccharide used to increase the viscosity of fracking fluids, which are later recovered as flowback water. The high molecular weight guar molecules are broken down into smaller compounds having substantially lower molecular weights. As the guar polymers are broken down into smaller molecules, the viscosity of the flowback water is substantially decreased.

The method of the present invention comprises the steps of pressurizing the flowback water, heating the flowback water, and allowing the pressurized and heated water to spend a residence time in a vessel. In a preferred embodiment, the water is heated to about 150 to about 250 degrees Celsius and pressurized to about 200 to about 500 psig. The combination of high heat and high pressure causes the large guar molecules to break down into smaller molecules, thereby decreasing the viscosity of the fluid. In addition, the greater the residence time in the vessel, the greater the extent of decomposition of the guar polymers. In a preferred embodiment, the viscosity is reduced by at least 50% and may be reduced by 70% or more. The reduction in viscosity allows the water to be filtered or further treated by other conventional treatment methods. Although the preferred embodiment of the invention treats flowback water contaminated with guar, the invention may be used to effectively treat any type of wastewater stream contaminated with guar, similar gelling agents or other biological polymers, or other contaminants.

In a preferred embodiment, the flowback water is heated and flows under pressure through at least one plug flow reactor. The guar decomposes as the fluid flows through the reactor, and the reactor effluent has a significantly lower viscosity than the untreated fluid. In alternative embodiments, the system for treating flowback water may comprise multiple plug flow reactors in series or in parallel. In a preferred embodiment, the system is designed to treat about 12,000 gallons of flowback water in approximately 4 hours.

Accordingly, an object of the present invention is to provide a method for treating hydraulic fracturing flowback water contaminated with guar or similar gelling agents by pressurizing and heating the flowback water in order to break down the large guar molecules into smaller molecules. Furthermore, another object of the present invention is to provide a system for treating flowback water that is capable of treating substantial quantities of flowback water contaminated with guar or similar gelling agents. Yet another object of the present invention is to provide a system for treating flowback water that can be economically constructed in the field near other fracking sites so that the treated water can be recycled for use in future fracking operations. Yet another object of the present invention is to provide a method for treating wastewater contaminated with a biological polymer.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
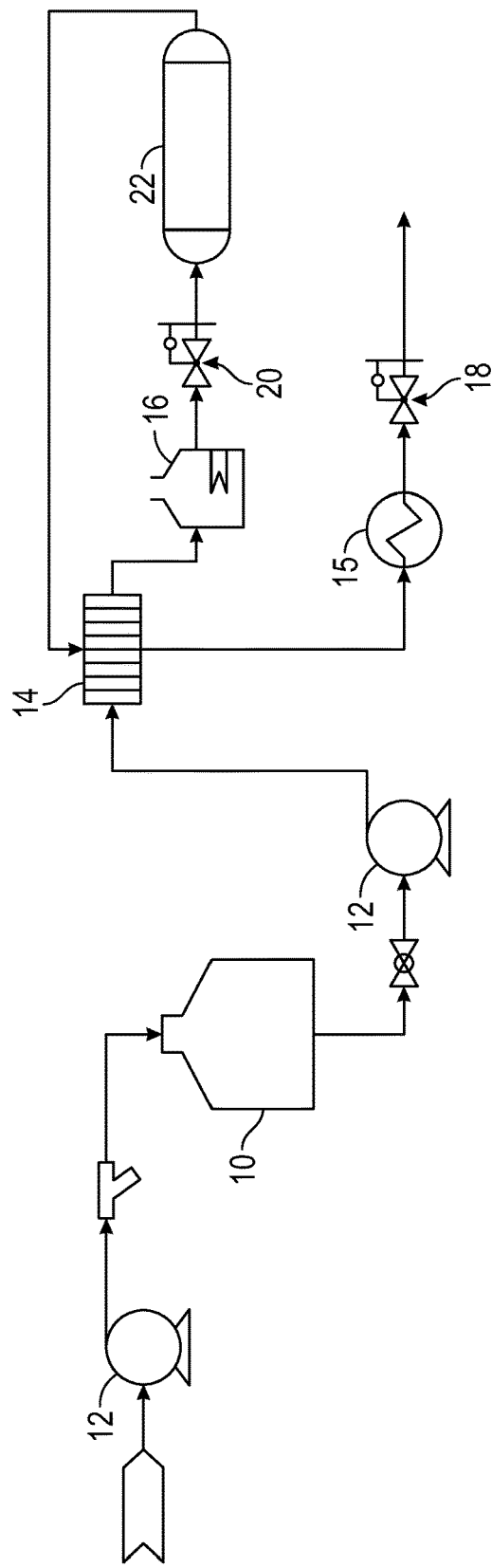
FIG. 1 shows a process flow diagram of a system for treating water contaminated with a biological polymer in accordance with the present invention.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

A preferred embodiment of the invention is directed to a system and method for treating wastewater contaminated with a biological polymer. As used herein, the term "biological polymer," also commonly called "biopolymers," refers to any type of polymer produced by a living organism and may include guar gum or other types of polysaccharides or other complex carbohydrates, or any type of protein such as whey protein. In addition, the term "wastewater," as used herein, may refer to any aqueous solution contaminated with a biological polymer or other contaminants and may include wastewater produced during hydraulic fracturing operations or wastewater produced as a by-product of food processing operations, such as wastewater produced during the production of foods such as cheese. The method is particularly advantageous for treating hydraulic fracturing flowback water contaminated with a gelling agent, such as guar gum. Flowback water recovered during fracking operations typically contains high levels of guar or similar gelling agents used to increase the viscosity of fracking fluids. The method of the present invention breaks down the high molecular weight guar molecules into smaller compounds having substantially lower molecular weights. These smaller compounds generally comprise simple sugars. As the guar molecules break down into simple sugars and other smaller compounds, the viscosity of the flowback water is substantially decreased. Once the viscosity is reduced, the wastewater can be filtered or treated further by other conventional treatment methods.

The method of the present invention comprises the steps of pressurizing the flowback water to at least about 50 psig, heating the flowback water to at least about 125 degrees Celsius, and allowing the pressurized and heated water to spend a residence time in a vessel. In a preferred embodiment, the water is heated to about 150 to about 250 degrees Celsius, and in a more preferred embodiment to about 200 to about 250 degrees Celsius. The water is preferably pressurized to about 200 to about 500 psig, and more preferably to about 250 to about 450 psig. The combination of high heat and high pressure causes the large guar molecules to break down into smaller molecules, thereby decreasing the viscosity of the fluid.

In addition, the greater the residence time in the vessel, the greater the extent of decomposition of the guar polymers. In a preferred embodiment, the residence time is at least 3 minutes and in a more preferred embodiment the residence time is 10 minutes or more. The residence time is preferably sufficient to reduce the viscosity of the wastewater to less than about 3 centistokes at 25 degrees Celsius. Further, the viscosity is preferably reduced by at least 50% and may be reduced by 70% or more.

The temperature, pressure, or residence time may be increased to cause a greater reduction of the viscosity of the wastewater. Each of these variables may be adjusted according to cost considerations and/or a desired target viscosity reduction. The preferred ranges of values presented above represent only one preferred embodiment of the present invention.

To illustrate the effects of temperature and pressure on the viscosity of an aqueous solution containing guar, five 20 ml samples of an aqueous solution containing about 1% by weight guar were prepared. The samples were each placed into a 50 ml bomb reactor and heated to different temperatures ranging from about 150 degrees Celsius to about 200 degrees Celsius. Initially, the solution started at atmospheric pressure and about 25 degrees Celsius. Under these conditions, the solution had an initial viscosity of about 4,000 centistokes (for reference, the viscosity of pure water at 25 degrees Celsius is approximately 0.9 centistokes). In each case, the temperature of the bomb reactor was increased and took approximately 20 minutes to reach the desired temperature. The resulting pressure inside the reactor ranged from about 100 to about 250 psig.

The first three samples were heated to about 150 degrees Celsius and held at this temperature for varying lengths of time. The first of these samples was taken from the bomb reactor immediately upon reaching the 150 degree temperature. The viscosity of this sample was measured at 29.9 centistokes (cst) at 25 degrees Celsius. The second sample was held at about 150 degrees Celsius for about 10 minutes. The viscosity of this sample was 24.1 cst. The third sample was held at about 150 degrees Celsius for about 60 minutes. The viscosity of this sample was 6.6 cst. Thus, the viscosity of the solution decreased substantially as the solution was held at an approximately constant temperature of about 150 degrees Celsius and a pressure of at least about 100 psig. These results indicate that exposing the solution to increased temperatures for increased periods of time (along with the resulting increase in pressure inside the bomb reactor) causes the guar gum polymeric backbone to decompose into simple sugars. Thus, the guar polymers were further degraded as the residence time was increased.

The fourth sample was heated to about 167 degrees Celsius and held at approximately this temperature for about 10 minutes. The pressure inside the reactor increased to about 150 psig. The viscosity of this sample was 12.4 cst. This result indicates that the guar is mostly decomposed into smaller compounds in this sample. Thus, increasing the temperature and pressure caused further degradation of the guar polymers.

The fifth sample was heated to about 200 degrees Celsius and held at approximately this temperature for about 10 minutes. The pressure inside the reactor increased to about 250 psig. The viscosity of this sample was 1.7 cst. This result indicates that the guar is almost completely decomposed into smaller sugars under these conditions.

In each of the above samples, and in data discussed below, the viscosity of the treated water is measured at approximately 25 degrees Celsius.

In a preferred embodiment, the vessel utilized is a plug flow reactor. The contaminated flowback water is heated and flows under pressure through at least one plug flow reactor. The guar decomposes as the fluid flows through the reactor, and the reactor effluent has a significantly lower viscosity than the untreated fluid. This system allows guar-contaminated flowback water to be treated in a continuously operating system. This system may be economically constructed on-site such that contaminated flowback water may be treated close to the source and recycled for other fracking operations.

The following five examples illustrate plug flow reactor conditions that may be utilized in order to effectively degrade guar polymers typically contained in recovered flowback water. In each example, a 40 gallon batch of an aqueous solution containing about 0.2% by weight guar was processed through a plug flow reactor. The flow rates, temperatures, and pressures in the plug flow reactor were varied between the examples as described below.

These examples are merely illustrative of aspects of the invention and do not in any way limit the scope of the invention as disclosed herein.

Batch 1: The initial viscosity of this batch was measured at 4.5 cst at 25 degrees Celsius. The batch was run through a plug flow reactor at about 150 degrees Celsius and about 250 psig. The flow rate was about 0.5 gallons per minute (gpm). The final viscosity was measured at 2.83 cst at 25 degrees Celsius, a decrease in viscosity of about 37%.

Batch 2: The initial viscosity of this batch was measured at 5.52 cst. The batch was run through the plug flow reactor at about 150 degrees Celsius and about 450 psig. The flow rate was about 1.75 gpm. The final viscosity was measured at 5.17 cst, a decrease in viscosity of about 6%.

Batch 3: The initial viscosity of this batch was measured at 4.25 cst. The batch was run through the plug flow reactor at about 150 degrees Celsius and about 1500 psig. The flow rate was about 1.75 gpm. The final viscosity was measured at 2.98 cst, a decrease in viscosity of about 30%.

Batch 4: The initial viscosity of this batch was measured at 5.52 cst. The batch was run through the plug flow reactor at about 200 degrees Celsius and about 250 psig. The flow rate was about 0.5 gpm. The final viscosity was measured at 1.53 cst, a decrease in viscosity of about 72%.

Batch 5: The initial viscosity of this batch was measured at 5.52 cst. The batch was run through the plug flow reactor at about 200 degrees Celsius and about 450 psig. The flow rate was about 1.75 gpm. The final viscosity was measured at 1.99 cst, a decrease in viscosity of about 64%.

The results of running each of the five batches through the plug flow reactor under the conditions as described above are summarized in the following table.

TABLE 1

| Batch | Temperature (degrees Celsius) | Pressure (psig) | Flow Rate (gpm) | Initial Viscosity (cst) | Final Viscosity (cst) | Percent Decrease (%) |
|---|---|---|---|---|---|---|
| 1 | 150 | 250 | 0.5 | 4.5 | 2.83 | 37 |
| 2 | 150 | 450 | 1.75 | 5.52 | 5.17 | 6 |
| 3 | 150 | 1500 | 1.75 | 4.25 | 2.98 | 30 |
| 4 | 200 | 250 | 0.5 | 5.52 | 1.53 | 72 |
| 5 | 200 | 450 | 1.75 | 5.52 | 1.99 | 64 |

As illustrated in Table 1, the temperature, pressure, and flow rate of the guar-contaminated solution each affect the degradation of the guar polymers and thus the final viscosity of the solution. The results of Batches 2 and 3, which were both run at approximately the same temperatures and flow rates, indicate that a substantial increase in pressure results in a substantial decrease in the viscosity of the solution.

Batches 1 and 4 were both run at approximately the same pressures and flow rates, with only the temperature being varied. Similarly, Batches 2 and 5 varied only the temperature, as well. The results of these batches indicate that increasing the temperature from about 150 degrees Celsius to about 200 degrees Celsius results in a substantially greater decrease in viscosity of the solution. The two batches run at 200 degrees Celsius resulted in almost complete degradation of the guar molecules.

Batches 4 and 5 were both run at approximately the same temperature of about 200 degrees Celsius. However, both the pressure and the flow rate of Batch 5 were increased relative to Batch 4. Under these conditions, Batch 4 saw a larger decrease in viscosity as compared to Batch 5. As the flow rate is increased through the plug flow reactor, the residence time in the reactor is decreased, thereby resulting in a less substantial decrease in viscosity as compared to a lower flow rate. As indicated by the results of Batches 4 and 5, the decreased residence time in the reactor can be somewhat offset by an increase in pressure, as well as an increase in the shear force of the flow rate. However, residence time is an important variable in treating guar-contaminated wastewater.

In a preferred embodiment of the invention, the guar-contaminated flowback water is processed through at least one plug flow reactor at a temperature of at least 200 degrees Celsius. Processing the flowback water at this temperature provides the most effective degradation of the guar molecules.

Prior to treating the prepared solution in the plug flow reactor, a 300 milliliter sample of the initial 0.2% guar solution was filtered through a filter having a mesh size of 2 microns. The untreated solution partially clogged the filter, and it took from 7 to 8 minutes for a substantial portion of the sample to pass through the filter. After treating the guar solution in the plug flow reactor, a 300 milliliter sample of each of the treated solutions was filtered through a 2 micron filter at about 25 degrees Celsius. In each case, the treated sample passed through the filter within 10 seconds. This test demonstrates the degradation of the guar polymers and indicates that the treated solution may now be filtered or further treated by conventional treatment methods, if necessary.

The methodology described above was also used to treat sample of whey permeate produced during cheese production. Whey permeate is produced by the removal of solids from the liquid remaining after milk has been curdled and strained. Whey is generated at a rate of about 9 kg per kilogram of cheese produced. Discharging of whey as a wastewater stream creates pollution problems due to high biological oxygen demand (BOD), which is typically around 35-40 grams per liter (g/L). This high BOD is due mainly to lactose, which is typically present at concentrations of about 4.5 to 5%.

To treat the whey permeate, two samples were placed in a reactor and pressurized and heated. Sample 1 was heated to about 150 degrees Celsius at about 150 psig, and Sample 2 was heated to about 200 degrees Celsius at about 250 psig. The whey wastewater contains whey protein and various other contaminants such as ammonia and phosphorus. Under conditions of high temperature and high pressure, the whey protein polymers were degraded into smaller compounds. Some of the smaller compounds produced are water soluble, while others are insoluble in water or only partially soluble. The samples were tested, and the results are summarized in the table below.

TABLE 2

|  | Sample 1 | Sample 2 |
| --- | --- | --- |
| Temperature (C.) | 150 | 200 |
| Pressure (psig) | 150 | 250 |
| Ammonia (mg/L) | 130 | 13 |
| Phosphorus (mg/L) | 405 | 220 |
| Chemical Oxygen Demand (COD) (g/L) | 63.6 | 38.3 |
| Total Dissolved Solids (TDS) (g/L) | 39.4 | 19.7 |
| Total Suspended Solids (TSS) (mg/L) | 554 | 864 |

As shown in Table 2, TDS decreased under conditions of higher temperature and higher pressure. This result indicates that the whey protein polymers were degraded to a greater extent in Sample 2. Because some of the smaller compounds resulting from the increased degradation are water soluble, TDS levels decreased between the two samples. Table 2 also shows that TSS increased under conditions of higher temperature and higher pressure. As noted above, some of the smaller compounds are insoluble and thus result in an increase in TSS between the two samples. Additionally, increased temperatures and pressures unexpectedly resulted in significant decreases in levels of ammonia, phosphorus, and COD in the wastewater, which is beneficial for treating wastewater to be discharged to the environment.

Figure 2:
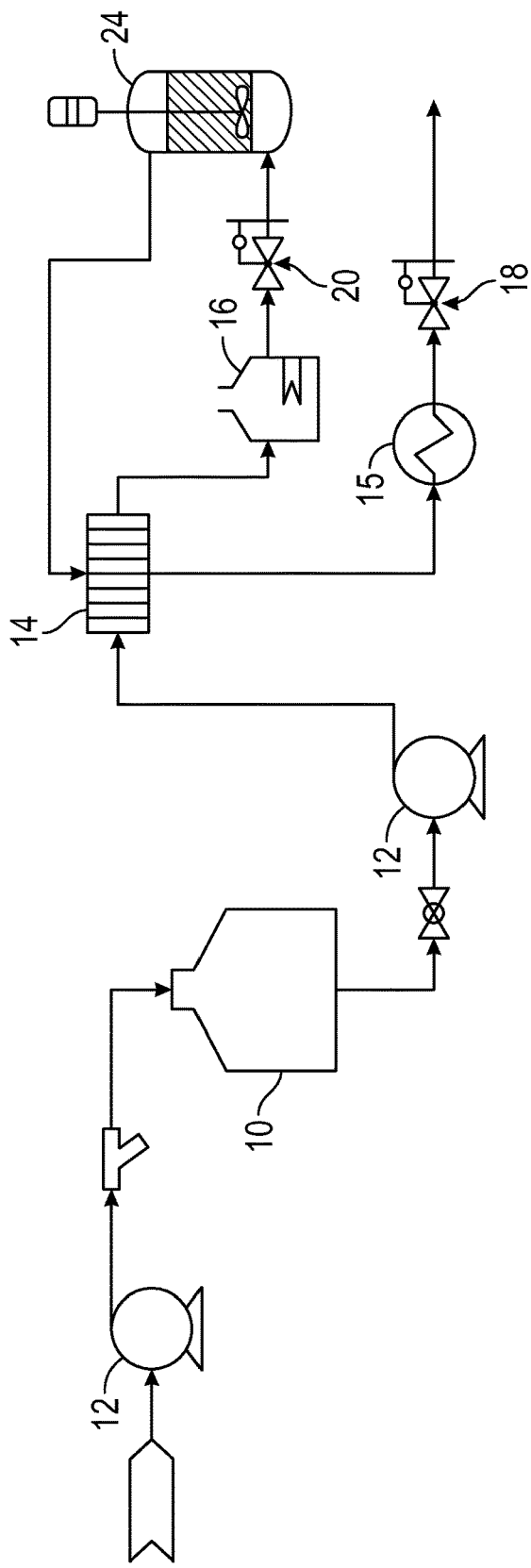
FIG. 2 shows a process flow diagram of a system for treating water contaminated with a biological polymer in accordance with the present invention.

Turning now to the drawings, FIGS. 1-2 illustrate process flow diagrams of a system for treating contaminated wastewater in accordance with the present invention. FIG. 1 shows a system utilizing a plug flow reactor 22. The system comprises a feed tank 10 for the untreated wastewater, pumps 12, pressure control valves 18, temperature control valves 20, a heat exchanger 14 for preheating the wastewater, a boiler 16 for heating the wastewater to a set temperature, a plug flow reactor (PFR) 22, and an optional chiller 15 for cooling the treated wastewater. An untreated wastewater stream is pumped through the heat exchanger 14 and the boiler 16 in order to heat the wastewater to a desired temperature. The pressure control valve 18 comprises a sensor configured for measuring the pressure in the reactor 22 and adjusts the flow to maintain a set pressure in the reactor 22. The temperature control valve 20 comprises a sensor configured for measuring the temperature at the boiler 16 outlet and adjusts the flow to maintain a set temperature in the reactor 22. In a preferred embodiment, the heat exchanger 14 exchanges heat between the reactor 22 outlet stream and the boiler 16 inlet stream. This configuration minimizes energy usage by preheating the untreated wastewater stream.

The PFR 22 is preferably sized such that the residence time in the reactor 22 is sufficient to reduce the viscosity of the wastewater stream by at least 50%. In addition, in a preferred embodiment, the PFR 22 is sized such that the residence time in the reactor 22 is sufficient to reduce the viscosity of the wastewater stream to less than about 3 centistokes at 25 degrees Celsius. FIG. 1 illustrates an exemplary embodiment utilizing a single PFR 22. In alternative embodiments, the system may utilize more than one PFR configured in series or in parallel, or both, depending on the specific treatment requirements.

FIG. 2 shows a similar system utilizing a continuous stirred tank reactor (CSTR) 24. As in the embodiment utilizing the PFR 22, the CSTR 24 is preferably sized such that the mean residence time in the reactor 24 is sufficient to reduce the viscosity of the wastewater stream by at least 50% and/or to less than about 3 centistokes at 25 degrees Celsius.

In an alternative embodiment, the system may be a batch system wherein separate batches of wastewater are treated. The wastewater is pressurized, heated, and transferred to a vessel. The batch of wastewater is then held in the vessel for a residence time. The preferred temperatures, pressures, and residence times utilized in the continuous systems described above are also applicable to the batch system. In one embodiment, the wastewater may be pressurized and heated after transferring the wastewater to the vessel.

As used herein, the term "vessel" may refer to a tank, a reactor such as a plug flow reactor or continuous stirred tank reactor, piping, or any similar type of equipment suitable for heating and pressurizing a liquid solution.

In a preferred embodiment, the wastewater treatment system is designed to treat about 12,000 gallons (about the size of a tanker car) of wastewater in approximately 4 hours, or at a rate of about 50 gpm. It should be understood that the system for treating wastewater may comprise any number of plug flow reactors or continuous stirred tank reactors, either in series or in parallel, or both, sized in order to achieve a substantial decrease in the viscosity of a wastewater stream contaminated with a biological polymer. When used to treat guar-contaminated flowback water, the reactor vessels are sized to reduce the viscosity of the flowback water such that the flowback water may be treated for other contaminants, if necessary, using conventional treatment technologies, such as membrane osmosis, so that the flowback water may then be recycled in fracking operations.

Although the preferred embodiment of the invention treats flowback water contaminated with guar, the method of the present invention may be used to effectively treat flowback water contaminated with similar polymeric gelling agents or other biological polymers including, but not limited to, wastewater containing proteins, such as wastewater by-product containing whey protein from cheese production.

It is understood that versions of the invention may come in different forms and embodiments. Additionally, it is understood that one of skill in the art would appreciate these various forms and embodiments as falling within the scope of the invention as disclosed herein.

What is claimed is:

1. A method of treating a wastewater stream contaminated with guar gum, said method comprising the steps of: (a) pressurizing the wastewater stream to at least about 250 psig, (b) simultaneously heating the wastewater stream to at least about 200 degrees Celsius, (c) flowing the pressurized and heated wastewater stream through a vessel, wherein the residence time in the vessel is not more than 10 minutes, and wherein the viscosity of the wastewater stream at 25 degrees Celsius is reduced by at least 50%.

2. The method of claim 1, wherein the vessel is a plug flow reactor.

3. The method of claim 2, wherein the viscosity of the wastewater stream is reduced to less than about 3 centistokes at 25 degrees Celsius.

4. The method of claim 1, wherein the vessel is a continuous stirred tank reactor.

5. The method of claim 4, wherein the residence time is a mean residence time.

6. The method of claim 4, wherein the viscosity of the wastewater stream is reduced to less than about 3 centistokes at 25 degrees Celsius.

7. The method of claim 1, wherein the wastewater stream is pressurized to about 250 psig to about 500 psig.

8. The method of claim 1, wherein the wastewater stream is heated to about 200 to about 250 degrees Celsius.

9. A method of treating wastewater contaminated with guar gum, said method comprising the steps of: (a) pressurizing the wastewater to at least about 250 psig, (b) simultaneously heating the wastewater to at least about 200 degrees Celsius, (c) transferring the wastewater to a vessel, and (d) holding the pressurized and heated wastewater in the vessel for a residence time, wherein the viscosity of the wastewater at 25 degrees Celsius is reduced by at least 50% in not more than 10 minutes of residence time.

10. The method of claim 9, wherein the viscosity of the wastewater is reduced to less than about 3 centistokes at 25 degrees Celsius.

11. The method of claim 9, wherein the wastewater is pressurized to about 250 psig to about 500 psig.

12. The method of claim 9, wherein the wastewater stream is heated to about 200 to about 250 degrees Celsius.

* * * * *